(12) United States Patent
Avrukin et al.

(10) Patent No.: US 10,705,987 B2
(45) Date of Patent: Jul. 7, 2020

(54) AUTONOMOUS PREFETCH ENGINE

(71) Applicant: LG ELECTRONICS INC., Seoul (KR)

(72) Inventors: Arkadi Avrukin, Santa Clara, CA (US); Seungyoon Song, Santa Clara, CA (US); Tariq Afzal, Santa Clara, CA (US); Yongjae Hong, Santa Clara, CA (US); Michael Frank, Santa Clara, CA (US); Thomas Zou, Santa Clara, CA (US); Hoshik Kim, Seoul (KR); Jungsook Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/301,127

(22) PCT Filed: May 12, 2017

(86) PCT No.: PCT/KR2017/004975
§ 371 (c)(1),
(2) Date: Nov. 13, 2018

(87) PCT Pub. No.: WO2017/196141
PCT Pub. Date: Nov. 16, 2017

(65) Prior Publication Data
US 2019/0138452 A1 May 9, 2019

Related U.S. Application Data

(60) Provisional application No. 62/335,652, filed on May 12, 2016.

(51) Int. Cl.
*G06F 13/16* (2006.01)
*G06F 13/40* (2006.01)
(Continued)

(52) U.S. Cl.
CPC ........ *G06F 13/1673* (2013.01); *G06F 3/0658* (2013.01); *G06F 12/084* (2013.01);
(Continued)

(58) Field of Classification Search
CPC . G06F 13/1673; G06F 3/0658; G06F 12/0862
See application file for complete search history.

(56) References Cited

U.S. PATENT DOCUMENTS

2007/0283101 A1    12/2007   El-Essawy et al.
2009/0019229 A1    1/2009    Morrow et al.
(Continued)

FOREIGN PATENT DOCUMENTS

WO    2009064793    5/2009

OTHER PUBLICATIONS

Mutlu et al., Address-Value Delta (AVD) Prediction: A Hardware Technique for Efficiently Parallelizing Dependent Cache Misses, 2013, https://web.archive.org/web/20130107225016/https://users.ece.cnnu.edu/~omutlu/pub/mutlu_ieee_tc06.pdf (Year: 2013.*
(Continued)

*Primary Examiner* — Yaima Rigol
(74) *Attorney, Agent, or Firm* — Lee, Hong, Degerman, Kang & Waimey

(57) ABSTRACT

A control circuit for controlling memory prefetch requests to system level cache (SLC). The control circuit includes a circuit identifying memory access requests received at the system level cache (SLC), where each of the memory access requests includes an address (ANEXT) of memory to be accessed. Another circuit associates a tracker with each of the memory access streams. A further circuit performs tracking for the memory access streams by: when the status is tracking and the address (ANEXT) points to an interval between the current address (ACURR) and the last prefetched address (ALAST), issuing a prefetch request to
(Continued)

the SLC; and when the status is tracking, and distance (ADIST) between the current address (ACURR) and the last prefetched address (ALAST) is greater than a specified maximum prefetch for the associated tracker, waiting for further requests to control a prefetch process.

19 Claims, 27 Drawing Sheets

(51) Int. Cl.
　　　*G06F 13/42*　　　(2006.01)
　　　*G06F 12/0804*　　(2016.01)
　　　*G06F 3/06*　　　(2006.01)
　　　*G06F 12/084*　　(2016.01)
　　　*G06F 12/0862*　　(2016.01)
　　　*G06F 12/0897*　　(2016.01)
　　　*G06F 15/78*　　　(2006.01)

(52) U.S. Cl.
　　　CPC ...... *G06F 12/0804* (2013.01); *G06F 12/0862* (2013.01); *G06F 12/0897* (2013.01); *G06F 13/40* (2013.01); *G06F 13/4234* (2013.01); *G06F 15/7807* (2013.01); *G06F 2212/1032* (2013.01); *G06F 2212/602* (2013.01); *G06F 2212/608* (2013.01); *Y02D 10/14* (2018.01); *Y02D 10/151* (2018.01)

(56) References Cited

U.S. PATENT DOCUMENTS

| | | |
|---|---|---|
| 2012/0072673 A1 | 3/2012 | Chirca et al. |
| 2012/0117323 A1 | 5/2012 | Cypher et al. |
| 2012/0131246 A1 | 5/2012 | Jeong et al. |
| 2013/0024624 A1 | 1/2013 | Benhase et al. |
| 2015/0199286 A1 | 7/2015 | Hughes et al. |
| 2015/0286571 A1* | 10/2015 | Cain, III ............. G06F 12/0862 711/123 |
| 2015/0301962 A1 | 10/2015 | Laughton et al. |
| 2015/0356014 A1 | 12/2015 | Sathish et al. |

OTHER PUBLICATIONS

PCT International Application No. PCT/KR2017/004975, Notification of Transmittal of the International Search Report and the Written Opinion of the International Searching Authority, or Declaration dated Sep. 19, 2017, 11 pages.

U.S. Appl. No. 16/301,160, Office Action dated Jun. 10, 2019, 6 pages.

PCT International Application No. PCT/KR2017/004977, Notification of Transmittal of the International Search Report and the Written Opinion of the International Searching Authority, or Declaration dated Aug. 23, 2017, 10 pages.

* cited by examiner

| V | STAT | INCR | ADIST | AGE | TDIST | PF | ACURR | ALAST | MSTID |
|---|------|------|-------|-----|-------|----|-------|-------|-------|

Fig. 3

| V | STAT | INCR | ADIST | AGE | TDIST | PF | ACURR | ALAST | MSTID |
|---|------|------|-------|-----|-------|----|-------|-------|-------|
| 0 | Available | X | X | X | X | 0 | X | X | X |

↓

| V | STAT | INCR | ADIST | AGE | TDIST | PF | ACURR | ALAST | MSTID |
|---|------|------|-------|-----|-------|----|-------|-------|-------|
| 1 | Init Track | X | X | 0 | X | 0 | Anext | X | Master_id |

Fig. 4

| V | STAT | INCR | ADIST | AGE | TDIST | PF | ACURR | ALAST | MSTID |
|---|------|------|-------|-----|-------|----|-------|-------|-------|
| 1 | Init Track | X | X | N | X | 0 | | X | Master_id |

↓

| V | STAT | INCR | ADIST | AGE | TDIST | PF | ACURR | ALAST | MSTID |
|---|------|------|-------|-----|-------|----|-------|-------|-------|
| 1 | Init Hit | Stride | X | 0 | X | 0 | Anext | X | Master_id |

Fig. 5

| V | STAT | INCR | ADIST | AGE | TDIST | PF | ACURR | ALAST | MSTID |
|---|---|---|---|---|---|---|---|---|---|
| 1 | Init Track | X | X | N | X | 0 | | X | Master_id |

↓

| V | STAT | INCR | ADIST | AGE | TDIST | PF | ACURR | ALAST | MSTID |
|---|---|---|---|---|---|---|---|---|---|
| 1 | Init Track | X | X | N+1 | X | 0 | | X | Master_id |

Fig. 6

| V | STAT | INCR | ADIST | AGE | TDIST | PF | ACURR | ALAST | MSTID |
|---|---|---|---|---|---|---|---|---|---|
| 1 | init Hit | | X | N | X | 0 | | X | Master_id |

↓

| V | STAT | INCR | ADIST | AGE | TDIST | PF | ACURR | ALAST | MSTID |
|---|---|---|---|---|---|---|---|---|---|
| 1 | Tracking | | X | 0 | N | 0 | Anext | X | Master_id |

Fig. 7

| V | STAT | INCR | ADIST | AGE | TDIST | PF | ACURR | ALAST | MSTID |
|---|---|---|---|---|---|---|---|---|---|
| 1 | Tracking | | X | | | 0 | | X | Master_id |

↓

| V | STAT | INCR | ADIST | AGE | TDIST | PF | ACURR | ALAST | MSTID |
|---|---|---|---|---|---|---|---|---|---|
| 1 | Tracking | | value | | | 1 | | Apref | Master_id |

Fig. 8

```
If (PF == 0)   // No prefetches issued; compare Delta with INCR
    If (Delta == INCR) => HIT
    Else               => MISS
Else           // PF = 1
    If (Delta==0) || (Delta==INCR) || (Delta==ADIST) || (sign(ADIST-Delta)==sign(ADIST))
        && (sign(Delta-INCR)==sign(INCR)) => HIT
    Else                                  => MISS
```

Fig. 9

- ACURR   <= Anext
- TDIST   <= (AGE + TDIST) / 2
- AGE     <= 0
- if (ADIST == Delta)   PF <= 0
  else                  PF <= PF

Fig. 10

| V | STAT | INCR | ADIST | AGE | TDIST | PF | ACURR | ALAST | MSTID |
|---|------|------|-------|-----|-------|----|----|-------|-------|
| 1 | Tracking | | value | N | M | | | | Master_id |

↓

| V | STAT | INCR | ADIST | AGE | TDIST | PF | ACURR | ALAST | MSTID |
|---|------|------|-------|-----|-------|----|----|-------|-------|
| 1 | Tracking | | Value* | 0 | N | | | Anext | Master_id |

Fig. 11

Once AGE reaches MAX_AGE, tracking is canceled and the Tracker is switched to "Available" state:
- V <= 0
- PF <= 0
- STAT <= "Available"

- ACURR <= Anext
- TDIST <= (AGE + TDIST) / 2
- AGE <= 0
- PF <= 0

- ACURR    <= Anext
- TDIST    <= (AGE + TDIST) / 2
- AGE      <= 0
- STAT     <= "Tracking"

Fig. 15

| V | STAT | INCR | ADIST | AGE | TDIST | PF | ACURR | ALAST | MSTID |
|---|------|------|-------|-----|-------|----|----|-------|-------|
| 1 | Wait Tracking | | value | | N | | M | | Master_id |

↓

| V | STAT | INCR | ADIST | AGE | TDIST | PF | ACURR | ALAST | MSTID |
|---|------|------|-------|-----|-------|----|----|-------|-------|
| 1 | Tracking | | Value* | | 0 | | N | Anext | Master_id |

Fig. 16

- ACURR    <= Anext
- TDIST    <= (AGE + TDIST) / 2
- AGE      <= AGE + 1
- STAT     <= "Initial Hit"

Fig. 17

| V | STAT | INCR | ADIST | AGE | TDIST | PF | ACURR | ALAST | MSTID |
|---|------|------|-------|-----|-------|----|----|-------|-------|
| 1 | Wait Tracking | | value | | N | | M | | Master_id |

↓

| V | STAT | INCR | ADIST | AGE | TDIST | PF | ACURR | ALAST | MSTID |
|---|------|------|-------|-----|-------|----|----|-------|-------|
| 1 | Init hit | | Value* | N+1 | M | | Anext | | Master_id |

Fig. 18

| MSTCFG0~31 | 31 | FLT_EN |
|---|---|---|
| | 30:25 | ALLOCTRACKERS |
| | 24 | EDA_EN |
| | 23:22 | not used |
| | 21 | DIS4KHIT |
| | 20 | DISHSTRD |
| | 19:16 | PFOS |
| | 15:6 | MAGE |
| | 5 | DISNINCR |
| | 4:0 | MPFN |

Fig. 21

| V | MSTID | STAT | INCR | ADIST | AGE | TDIST | PF | ACURR | ALAST |
|---|---|---|---|---|---|---|---|---|---|

Fig. 22

| Stride | Address Distance, Bytes | Stride | Address Distance, Bytes |
|---|---|---|---|
| +1 | 64 | 4 | 256 |
| -1 | -64 | -4 | -256 |
| +2 | 128 | 6 | 384 |
| -2 | -128 | -6 | -384 |
| 3 | 192 | 8 | 512 |
| -3 | -192 | -8 | 512 |

Fig. 24

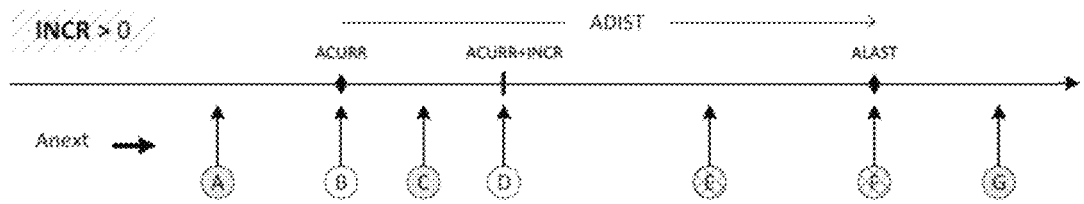
Fig. 25
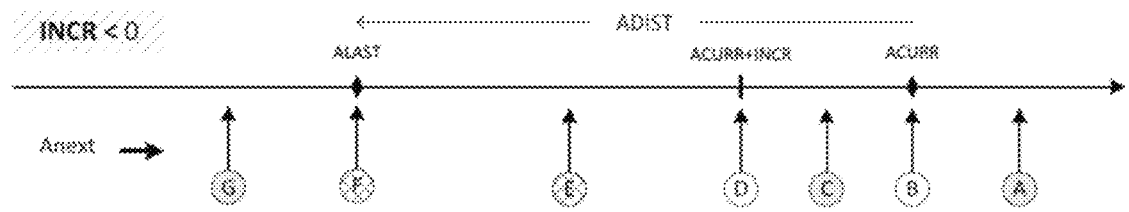
Fig. 26
| | INCR | Delta - INCR | Delta=0 | ADIST | Delta - ADIST | PF | Hit | Hit0 | PF | Comment |
|---|---|---|---|---|---|---|---|---|---|---|
| 1.PN | +/- | -/+ | 0 | x | x | x | 0 | 0 | - | Case: A, C |
| 2.PN | +/- | -/+ | 1 | x | x | x | 0 | 1 | - | Case: B |
| 3.PN | +/- | 0 | 0 | x | x | x | 1 | 0 | - | Case: D |
| 4.PN | +/- | +/- | 0 | x | x | 0 | 0 | 0 | - | Case: E1 |
| 5.PN | +/- | +/- | 0 | +/- | -/+ | 1 | 1 | 0 | - | Case: E2 |
| 6.PN | +/- | +/- | 0 | x | x | 0 | 0 | 0 | - | Case: F1 |
| 7.PN | +/- | +/- | 0 | +/- | 0 | 1 | 1 | 0 | 0 | Case: F2 |
| 8.PN | +/- | +/- | 0 | x | x | 0 | 0 | 0 | - | Case: G1 |
| 9.PN | +/- | +/- | 0 | +/- | +/- | 1 | 0 | 0 | - | Case: G2 |
Fig. 27

```
if (PF == 0)
    Hit = (Delta == 0) || (Delta == INCR)
else /* PF = 1 */
    Hit = (Delta == 0) || (Delta == INCR) || (Delta == ADIST) ||
        (sign(ADIST - Delta) == sign(ADIST)) && ((sign(Delta - INCR) == sign(INCR))
```

Fig. 28

```
if (Stat != AVAILABLE && Anext[ADDR_WIDTH-1:6] == Acurr[ADDR_WIDTH-1:6])
    tracker_hit_4k <= 1'b1
else if (Stat == TRACKING && Anext[ADDR_WIDTH-1:6] == Alast[ADDR_WIDTH-1:6]
    tracker_hit_4k <= 1'b1
else
    tracker_hit_4k <= 1'b0
```

Fig. 30

| reg_rank | Rank Address Bit Position |
|----------|---------------------------|
| 0 | [15] |
| 1 | [31] |
| 2 | [30] |
| 3 | [29] |
| 4 | [28] |
| default | rank address bit is always zero |

Fig. 33

| Offset | Access | Reset | Width | Description |
|---|---|---|---|---|
| 0x00 | R / W | 0x0 | 32 | CTRL – Control Register |
| 0x04 | R / W | 0x0 | 32 | MTDIST – Minimal Temoporal Distance |
| 0x08 | R / W | 0xFFF0 | 32 | TRUNC – Truncate size for TDIST |
| 0x0C | R / W | 0x10 | 32 | STRD1 – Stride 1 |
| 0x10 | R / W | 0x20 | 32 | STRD2 – Stride 2 |
| 0x14 | R / W | 0xF0 | 32 | STRD3 – Stride 3 |
| 0x18 | R / W | 0xE0 | 32 | STRD4 – Stride 4 |
| 0x1C | R / W | 0x0 | 32 | Reserved |
| 0x100 ~0x17C | R / W | 0x00024004 | 32 | MSTCFG0 – MSTCFG31 Auto Prefetch Master configuration |

Fig. 35

| Signal | Direction | Description |
|---|---|---|
| paddr[7:0] | Input | AMBA APB address signal |
| psel | Input | AMBA APB select signal |
| penable | Input | AMBA APB enable signal |
| pwrite | Input | AMBA APB write signal |
| pwdata[31:0] | Input | AMBA APB write data signal |
| pready | Output | AMBA APB ready signal |
| prdata[31:0] | Output | AMBA APB read data signal |
| pslverr | Output | AMBA APB slave error signal |

Fig. 36

| Signal | Direction | Description |
|---|---|---|
| slc_apf_req_addr[31:0] | Input | SLC request address |
| slc_apf_req_val | Input | SLC request valid |
| slc_apf_req_hp | Input | SLC request high priority: 0 – low, 1 – high |
| slc_apf_req_op | Input | SLC request type: 0 – read, 1 – write |
| slc_apf_req_id[31:0] | Input | SLC request ID |

Fig. 37

| Signal | Direction | Description |
| --- | --- | --- |
| reg_bank[2:0] | Input | DMC Bank Configuration<br>'b000 - [15:13] (LPDDR3)<br>'b001 - [14:12]<br>'b010 to 'b1111- [11:9] |
| reg_rank[2:0] | Input | DMC Rank Configuration<br>'b000 - [15]<br>'b001 - [31]<br>'b010 - [30]<br>'b011 - [29]<br>'b100 - [28]<br>'b101 to 'b1111- Reserved (LPDDR3) |
| reg_row[3:0] | Input | DMC Row Configuration<br>'b0000 - [30:16]<br>'b0001 - [29:16]<br>'b0010 - [28:16]<br>'b0011 - [30:15]<br>'b0100 - [29:15]<br>'b0101 - [28:15]<br>'b0110 - [27:15]<br>'b0111 to 'b1111- [31:16] |
| reg_chsel[3:0] | Input | DMC channel/ SLC Cluster selection<br>'b0000 - [8]<br>'b0001 - [9]<br>'b0010 - [10]<br>'b0011 - [11]<br>'b0100 - [12]<br>'b0101 - [24]<br>'b0110 - [32]<br>'b0111 to 'b1111- Reserved |
| reg_ddrch[1:0] | Input | DMC internal Channel Configuration<br>'b00 - [8]<br>'b01 to 'b11- Reserved |
| reg_2ranken | Input | 2RANKEN Control<br>0-Each DMC channel has 1 rank<br>1-Each DMC channel has 2 ranks |
| reg_2chen | Input | 2CHEN Control<br>0-Each SLC cluster is connected to 1 channel DMC<br>1-Each SLC cluster is connected to 2 channel DMC |
| reg_swizzle | Input | SWIZZLE Control<br>0-swizzle is disabled<br>1-swizzle is enabled |

Fig. 38

| Signal | Direction | Description |
|---|---|---|
| apt_clu0_addr[31:0] | Output | Prefetch request address for Cluster 0 |
| apt_clu0_hp | Output | High priority indicator for Cluster 0 prefetch requests |
| apt_clu0_req | Output | Pregetch request for Cluster 0 |
| clu0_apf_ack | Input | APF request was accepted by Cluster 0 |
| apt_clu1_addr[31:0] | Output | Prefetch request address for Cluster 1 |
| apt_clu1_hp | Output | High priority indicator for Cluster 1 prefetch requests |
| apt_clu1_req | Output | Pregetch request for Cluster 1 |
| clu1_apf_ack | Input | APF request was accepted by Cluster 0 |

Fig. 39

| Event | Bit | Description |
|---|---|---|
| e_req_drop | [ 0 ] | triggered when there is no available tracker and the request dropped after ID filtering |
| e_req_rcvd | [ 1 ] | triggered when APF receives a memory access request after ID filtering |

Fig. 40

AUTONOMOUS PREFETCH ENGINE

CROSS-REFERENCE TO RELATED APPLICATIONS

This application is the National Stage filing under 35 U.S.C. 371 of International Application No. PCT/KR2017/004975, filed on May 12, 2017, which claims the benefit of U.S. Provisional Application No. 62/335,652, filed on May 12, 2016, the contents of which are all hereby incorporated by reference herein in their entirety.

TECHNICAL FIELD

The present invention generally relates to device memory, and in particular, to controlling memory prefetch requests to system cache.

BACKGROUND ART

A cache is a component that transparently stores data so that future requests for that data can be served faster. The data that is stored within a cache might be values that have been computed earlier or duplicates of original values that are stored elsewhere. If requested data is contained in the cache (i.e., cache hit), this request can be served by simply reading the cache, which is comparatively faster. Otherwise (i.e., cache miss), the data must be fetched from its original storage location, which is comparatively slower. Prefetching is the operation of loading data or instructions in cache in anticipation of their need. Thus, the greater the number of requests that can be served from the cache, the faster the overall system performance.

DISCLOSURE OF THE INVENTION

Technical Problem

An object of the present invention is to provide an efficient control circuit for controlling memory prefetch requests to system level cache (SLC).

Solution to Problem

In accordance with an embodiment, a control circuit for controlling memory prefetch requests to system level cache (SLC) includes a circuit configured to identify memory access requests received at the system level cache (SLC) from a system on a chip (SoC) component, where each of the memory access requests include an address (ANEXT) of memory to be accessed and a component ID; a circuit configured to associate a tracker, from among a plurality of trackers, with each of identified memory access streams, where each of the plurality of trackers comprise entry parameters of status, increment, address distance (ADIST), age (AGE), temporal distance (TDIST), prefetch status (PF), current address (ACURR), and last prefetched address (ALAST); and a circuit configured to perform tracking for each of the identified memory access streams by: when the status is tracking and the address (ANEXT) points to an interval between the current address (ACURR) and the last prefetched address (ALAST), issuing a prefetch request to the system level cache (SLC); and when the status is tracking, and distance (ADIST) between the current address (ACURR) and the last prefetched address (ALAST) is greater than a specified maximum prefetch for the associated tracker, waiting for further requests to control a prefetch process.

In accordance with an embodiment, a memory device includes system level cache (SLC) and control circuitry comprising: a circuit configured to identify memory access requests received at the system level cache (SLC) from a system on a chip (SoC) component, where each of the memory access requests include an address (ANEXT) of memory to be accessed and a component ID; a circuit configured to associate a tracker, from among a plurality of trackers, with each of identified memory access streams, where each of the plurality of trackers comprise entry parameters of status, increment, address distance (ADIST), age (AGE), temporal distance (TDIST), prefetch status (PF), current address (ACURR), and last prefetched address (ALAST); and a circuit configured to perform tracking for each of the identified memory access streams by: when the status is tracking and the address (ANEXT) points to an interval between the current address (ACURR) and the last prefetched address (ALAST), issuing a prefetch request to the system level cache (SLC); and when the status is tracking, and distance (ADIST) between the current address (ACURR) and the last prefetched address (ALAST) is greater than a specified maximum prefetch for the associated tracker, waiting for further requests to control a prefetch process.

In accordance with yet another embodiment, a method for controlling memory prefetch requests to system level cache (SLC) includes identifying memory access requests received at the system level cache (SLC) from a system on a chip (SoC) component, wherein each of the memory access requests include an address (ANEXT) of memory to be accessed and a component ID; associating a tracker, from among a plurality of trackers, with each of identified memory access streams, wherein each of the plurality of trackers comprise entry parameters of status, increment, address distance (ADIST), age (AGE), temporal distance (TDIST), prefetch status (PF), current address (ACURR), and last prefetched address (ALAST); issuing a prefetch request to the system level cache (SLC), when the status is tracking and the address (ANEXT) points to an interval between the current address (ACURR) and the last prefetched address (ALAST); and waiting for further requests to control a prefetch process, when the status is tracking, and distance (ADIST) between the current address (ACURR) and the last prefetched address (ALAST) is greater than a specified maximum prefetch for the associated tracker.

These and other embodiments will also become readily apparent to those skilled in the art from the following detailed description of the embodiments having reference to the attached figures, the invention not being limited to any particular embodiment disclosed.

Advantageous Effects of Invention

One embodiment of the present invention provides an efficient control circuit for controlling memory prefetch requests to system level cache (SLC).

BRIEF DESCRIPTION OF DRAWINGS

FIG. 3 depicts an example of an entry structure for a tracker.

FIG. 4 depicts an example of value changes in an entry structure for a tracker.

FIG. 5 depicts change in entry content when switching from "Initial Tracking" to "Initial Hit."

FIG. 6 depicts change in entry content if staying in "Initial Tracking."

FIG. 7, which depicts change in entry content when switching from "Initial Hit" to "Tracking."

FIG. 8 depicts an example of an entry structure for a tracker in which there is a change in entry content after issuing a prefetch request.

FIG. 9 depicts an example of pseudo code with detailed HIT conditions that may be implemented.

FIG. 10 depicts an example of value changes when a HIT is detected.

FIG. 11 depicts an example of an entry structure for a tracker in which the HIT is detected in the "Tracking" state.

FIG. 15 depicts an example of value changes when a next request address was hit with INCR and ACURR.

FIG. 16 depicts an example of an entry structure for a tracker in which there is a change in fields for switching from "Wait Tracking" to "Tracking."

FIG. 17 depicts an example of value changes when a next request address was a miss with the same MSTID.

FIG. 18 depicts an example of an entry structure for a tracker in which there is a change in fields for switching from "Wait Tracking" to "Initial hit."

FIG. 21 depicts a table for the master configuration register set.

FIG. 22 depicts an example of an entry structure for a tracker in which there is control entry with MSTID.

FIG. 24 is a table showing examples of hardwired strides and their associated distance value.

FIG. 25 shows analysis of a request address, Anext, in the tracker when there is a positive increment FIG. 26 shows analysis of a request address, Anext, in the tracker when there is a negative increment.

FIG. 27 is a table showing a number of hit conditions and associated cases.

FIG. 28 is pseudo-code for addressing Hit detection conditions.

FIG. 30 is an example of pseudo code that may be used to generate the flag.

FIG. 33 is a table providing an example of a DRAM rank address configuration.

FIG. 35 is a table showing a summary of APF registers that may be implemented in the tracker.

FIG. 36 is a table showing register interface signals that may be utilized by the tracker.

FIG. 37 is a table showing SLC observation signals that may be utilized by the tracker.

FIG. 38 is a table showing DRAM memory address configurations that may be implemented by the tracker FIG. 39 is a table showing APF prefetch interface signals.

FIG. 40 is a table showing AFT event signals.

MODE FOR INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Prefetching is used to load cache with data which most likely will be referenced soon thereafter. It is generally speculative in nature. However, if predictions of future requests are good, most of the prefetched data will be accessed from the cache, thus reducing access time to main memory for actual requests.

An Autonomous Prefetch Engine (also referred to herein as APF engine, or more simply as APF) dynamically observes memory access behavior and deduces possible access regularities from such behaviors. More specifically, features of the APF engine include each read address entering system level cache (SLC) is considered as part of an access sequence with some access stride. There is generally a pool of M strides (some of which are fixed and others programmable). If the distance between a current address and a subsequent one matches one of the strides from the pool, a next assumption is made—that there is indeed a sequence and tracking of this sequence is established and an assumed stride is recorded. If then yet another address has the same stride, the confidence in that sequence increases. Once some level of confidence is achieved, the APF engine will initiate prefetch requests in accordance with a perceived access pattern. If for some (e.g., programmable) period of time there were no accesses conforming to the assumed stride, tracking of that sequence can be discontinued.

Figure 1:
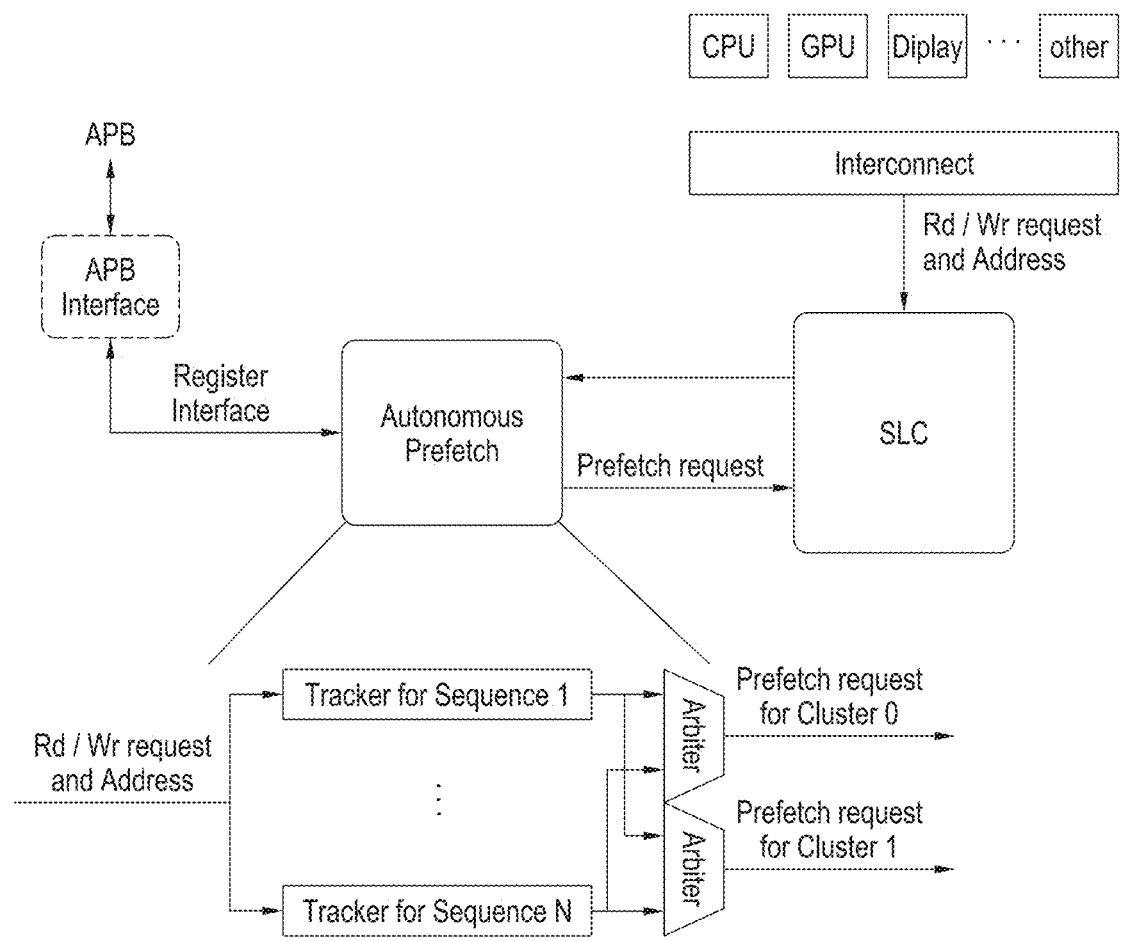
FIG. 1 is a block diagram depicting an autonomous "self-learning" prefetch engine.

FIG. 1 is a block diagram depicting an autonomous "self-learning" prefetch engine. As shown in this figure, the APF observes requests coming from the interconnect to the SLC and is capable of tracking N sequences. If a new address does not belong to any of the already tracked sequences and there is an available tracker, it is recorded in that tracker and the tracker becomes unavailable. If there is no tracker available, nothing happens such that a potential sequence will not be tracked for at least a period of time. Both memory request information and the prefetch request to the SLC are conveyed using internal signals, and access to APF engine registers is performed using an advanced peripheral bus (APB) register access interface.

Each arbiter uses information of relative frequency of requests in the sequence (e.g., temporal distance between requests such as the TDIST description discussed in detail in later figures) coming together with prefetch requests from individual trackers. The arbiter also uses a DRAM bank address of prefetch requests from trackers to prevent DRAM bank collision. When multiple trackers generate prefetch requests and some of them have a different DRAM bank address, the arbiter tries to avoid selecting a request that has the same bank address as the previously accepted request. This helps the memory controller to improve schedule memory access requests from the SLC.

As shown in FIG. 1, there are N number of trackers connected to two arbiters, and each arbiter sends a request to each SLC cluster. Note that the APF has the capability to keep tracking sequences on write commands, but some SLC implementations do not require this feature and thus the SLC does not, in such embodiments, send any write requests to the APF.

Figure 2:
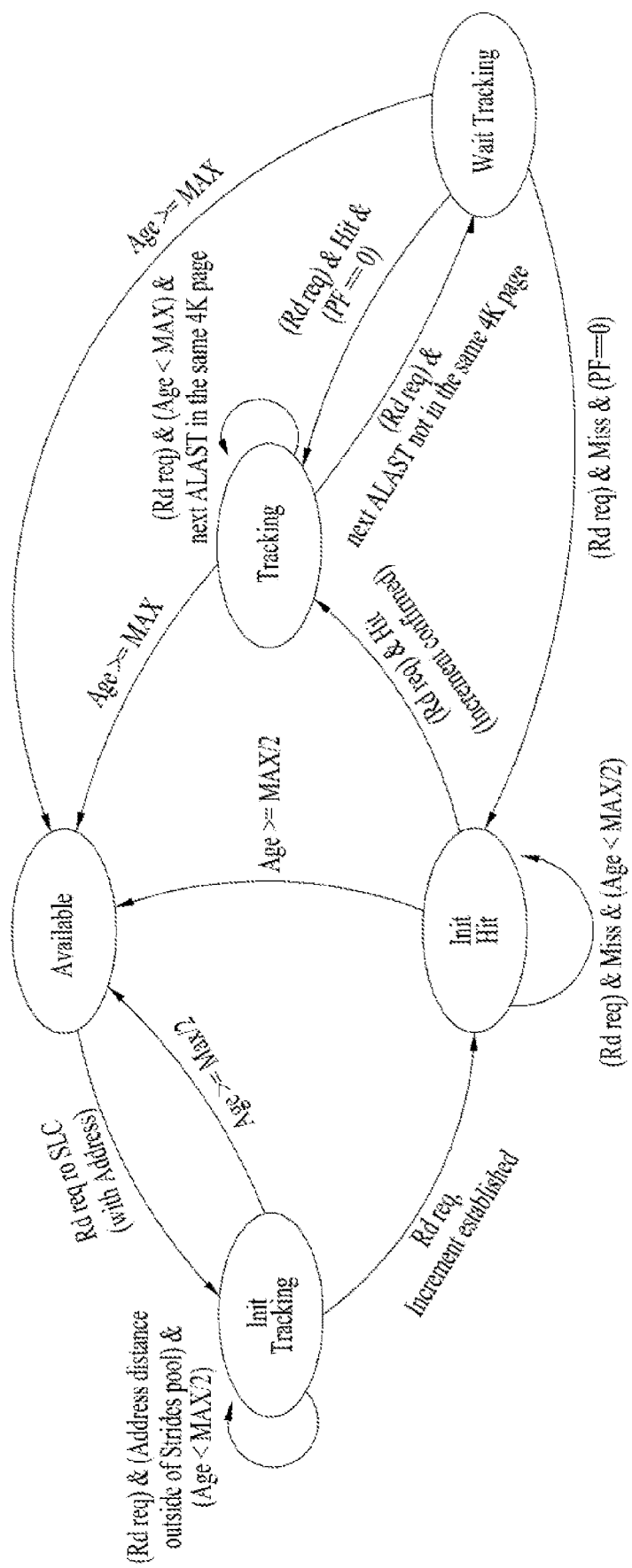
FIG. 2 is a state diagram showing tracker state transitions.

FIG. 2 is a state diagram showing the tracker state transition. For each sequence, the tracker functions as defined by content of the set of descriptors that is implemented (e.g., FIG. 3). This set is called an entry and each descriptor is called a field in this entry. In general, the tracker implemented according to FIG. 2 can be in one of four states; namely, available, initial tracking: new address is put into the entry as a current address; initial hit: some stride is assumed and put into the entry (as increment); and tracking: hit again and assumed stride is confirmed.

FIG. 3 depicts an example of an entry structure for a tracker. Operation of the tracker is generally controlled by the content of descriptors, logically forming the tracker's control entry. Note that the terms "descriptor" and "field" will be used to reference the items of the entry structure.

In accordance with an embodiment, the entry structure of FIG. 3 includes V (Valid), such that when V=0, the tracker is available, otherwise (V=1) means it is busy. The STAT field (tracker status), can include values such as available; initial tracking; initial hit; and tracking. In some embodiments, STAT="Available" is equivalent to V=0, and thus, V could be eliminated if so desired.

The INCR (increment) field is one of the stride values from the pool. The ADIST (address distance between ALAST and ACURR) is valid if PF=1. AGE is the number of SLC requests since last Hit, and TDIST (temporal distance) is the average interval between hits, measured in the number of SLC requests.

PF (Prefetch) is valid when STAT="Tracking" and PF is set to "1" if Prefetch request(s) have been issued. It is cleared to ?0" when the tracker's state is switched to "Available", or when ADIST=0 (meaning that all previous prefetches, if any, have been consumed).

ACURR (current address) is the last SLC address which was considered a hit; ALAST (last address) is the latest address of a prefetch request; and MSTID is the master ID.

FIG. 4 depicts an example of value changes in an entry structure for a tracker. In particular, FIG. 4 shows a change in entry content when status is transitioned from "Available" to "Initial Tracking." For example, during operation, the tracker watches the SLC request address, Anext. If there is no hit in valid trackers and there is an available tracker, Anext is put into the ACURR field of the available tracker. The V bit is also set to 1 and STAT is changed to "Initial Tracking"; the tracker thus becomes unavailable.

When the STAT field is initial tracking the APF will keep watching SLC requests. If the distance between Anext and the value in ACURR matches one of the strides in the pool, then STAT is set to Initial Hit, INCR is set to Stride, ACURR is set to Anext, and AGE is set to 0. An example of this is shown in FIG. 5, which depicts change in entry content when switching from "Initial Tracking" to "Initial Hit."

If the distance between Anext and the value in ACURR does not match one of the strides in the pool, the state is not changed, and the value of AGE is incremented by 1. An example of this is shown in FIG. 6, which depicts change in entry content if staying in "Initial Tracking." Once AGE reaches some value, (e.g., MAX_AGE/2), tracking is canceled and the tracker is switched to "Available" state, where V is set to 0, PF is set to 0, and STAT is set to Available. Note that the amount of strides in the pool should not be overly large in order to limit size and complexity of implementation. For example, there may be 4 to 8 fixed strides and 2 to 4 programmable strides. Fix strides may have values such as +/−64, +/−128, +/−256, and the like.

When STAT is Initial Hit, the APF keeps watching SLC requests. If the distance between Anext and the value in ACURR matches the value in the INCR field, then STAT is set to Tracking, ACURR is set to Anext, TDIST is set to AGE, AGE is set to 0, and remaining fields are not changed. An example of this is shown in FIG. 7, which depicts change in Entry Content when switching from "Initial Hit" to "Tracking."

If the distance between Anext and the value in ACURR is not matching the value in the INCR field, the state is not changed, and the value of AGE is incremented by 1.

Once AGE reaches MAX_AGE/2, tracking is canceled and the Tracker is switched to "Available" state and V is set to 0, PF is set to 0, STAT is set to "Available"

When STAT is set to "Tracking" the tracker is in the tracking state and performs two operations; one is issuing prefetch requests and the second is watching for SLC requests.

FIG. 8 depicts an example of an entry structure for a tracker in which there is a change in entry content after issuing prefetch requests. After entering the tracking state, the tracker starts issuing prefetch requests. After each issued prefetch, its address is saved in the ALAST field of the entry, a difference between ALAST and ACURR is saved in the ADIST field, and the PF field is set to "1". Remaining fields are unchanged.

If any prefetch request was not generated previously, the tracker will generate a prefetch request based on ACURR. If issued, the request address will be based on the ALAST field.

While watching for SLC requests, the Anext field is compared to the ACURR and a delta is calculated to detect a HIT. The delta is generally calculated by Anext−ACURR. FIG. 9 depicts an example of pseudo code with detailed HIT conditions that may be implemented. If a HIT is detected, the values for ACURR, TDIST, AGE, and PF may be changed as set out in FIG. 10, which depicts an example of value changes when a HIT is detected. Correspondingly, FIG. 11 depicts an example of an entry structure for a tracker in which the HIT is detected in the "Tracking" state.

If a miss is detected, no fields of the entry structure are changed except for AGE, which value is incremented by 1. Once AGE reaches MAX_AGE, tracking is canceled and the tracker is switched to the "Available" state. In this scenario, the fields of V, PF and STAT are set according to FIG. 12. Note that when the tracker is not in the tracking state, tracking is canceled and switched to "Available" if AGE reaches half of MAX_AGE.

Consider now the case that ALAST has reached a desired boundary (e.g., a 4 KB boundary). When EN4KTRACKEN=1 in CTRL, as soon as ALAST reaches to the 4 KB memory address boundary, the tracker's state may transition from "Tracking" to "Wait Tracking". Accordingly, if a Hit is detected, the fields of ACURR, TDIST, AGE and PF may be set according to FIG. 13. For ease of discussion, various embodiments will be discussed with regard to a 4 KB boundary, but other boundary values may alternatively be used.

Figures 12, 13, 14:
FIG. 12 depicts an example of value changes when AGE reaches MAX_AGE, tracking is canceled and the tracker is switched to the "Available" state.
FIG. 13 depicts an example of value changes when a Hit is detected.
FIG. 14 depicts an example of an entry structure for a tracker in which there is a change in the fields for switching from "Tracking" to "Wait Tracking."

FIG. 14 depicts an example of an entry structure for a tracker in which there is a change in the fields for switching from "Tracking" to "Wait Tracking." When the tracker is in the WAIT_TRACKING state, it waits until all prefetched data is consumed (PF<=0). If the following request address stays in the stream (ANEXT==ALAST+INCR) after all prefetched data is consumed, the tracker would transition to the TRACKING state again and start generating prefetch requests until it reaches to the next 4 KB address boundary.

If the following request address does not stay in the stream after all prefetched data is consumed, the state would be transitioned from WAIT_TRACKING to INIT_HIT. In this transition, ACURR would be updated with the current ANEXT. This behavior assumes that the updated ACURR is the start address of the new 4 KB memory page when it is scattered from the previous page. If the next request address were hit with INCR and ACURR, it would keep prefetching on the new 4 KB page. This mechanism could reduce over-prefetch requests caused by a scattered 4 KB memory page region. Note that when the tracker is not in the tracking state, tracking is canceled and switched to "Available" if AGE reaches the half of MAX_AGE.

If the next request address were hit with INCR and ACURR, then the fields ACURR, TDIST, AGE and STAT may be set according to FIG. 15.

FIG. 16 depicts an example of an entry structure for a tracker in which there is a change in fields for switching from "Wait Tracking" to "Tracking."

If the next request address was a miss with the same MSTID, then the fields ACURR, TDIST, AGE and STAT may be set according to FIG. 17.

FIG. 18 depicts an example of an entry structure for a tracker in which there is a change in fields for switching from "Wait Tracking" to "Initial hit."

Figure 19:
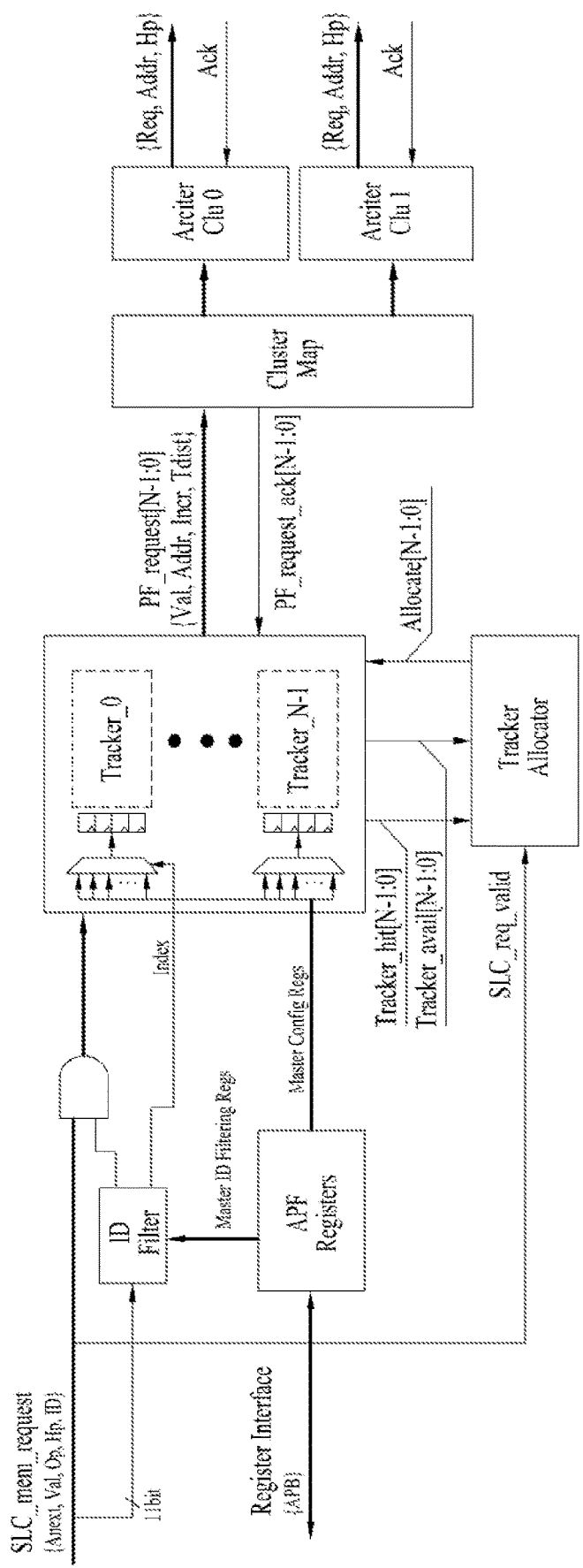
FIG. 19 is a block diagram of various components that may be used to form an autonomous prefetch engine (APF) in accordance with an embodiment of the present invention.

FIG. 19 is a block diagram of various components that may be used to form an autonomous prefetch engine (APF) in accordance with an embodiment of the present invention.

To minimize or eliminate pollution of trackers with random requests (e.g. from the CPU), or requests coming from components which already have prefetch support (e.g., CPU, GPU, engines with PPF attached), the APF contains the Master ID filter. Unique master ID may be assigned to each master or master group in the subsystem. This ID information is delivered to the APF with the SLC memory request and APF decides which masters are to be prefetched. Index numbers may be assigned according to the table below.

TABLE 1

| Index Master, MSTCFG 0~31 | Configurable at the master/NOC |
|---|---|

After filtering, the request is submitted to all trackers, 0 to N−1. Each of the trackers considers the request, and if the request hits to one of the trackers, the request processing is finished inside of this tracker. The tracker allocator analyzes the results of the search from individual trackers. If the request does not hit as to any of the trackers, this request comes from a potential new sequence. An available tracker is allocated for this potential sequence. In the case when all trackers are busy, no further action is performed.

In some embodiments, a further operation is to clean the tracker with the AGE>=Water Mark (e.g., specified in register) and then allocate it to the new request.

When a tracker is allocated for a potential sequence, the tracker receives the high priority flag information with the request. When a tracker is allocated with the flag set and started generating prefetch requests, the prefetch requests from this tracker are considered as for the high priority master. This high priority master information is delivered to the downstream SLC with prefetch requests. The 'apf_clu0_hp' and 'apf_clu1_hp' ports may used to support this (e.g., FIG. 39).

Figure 20:
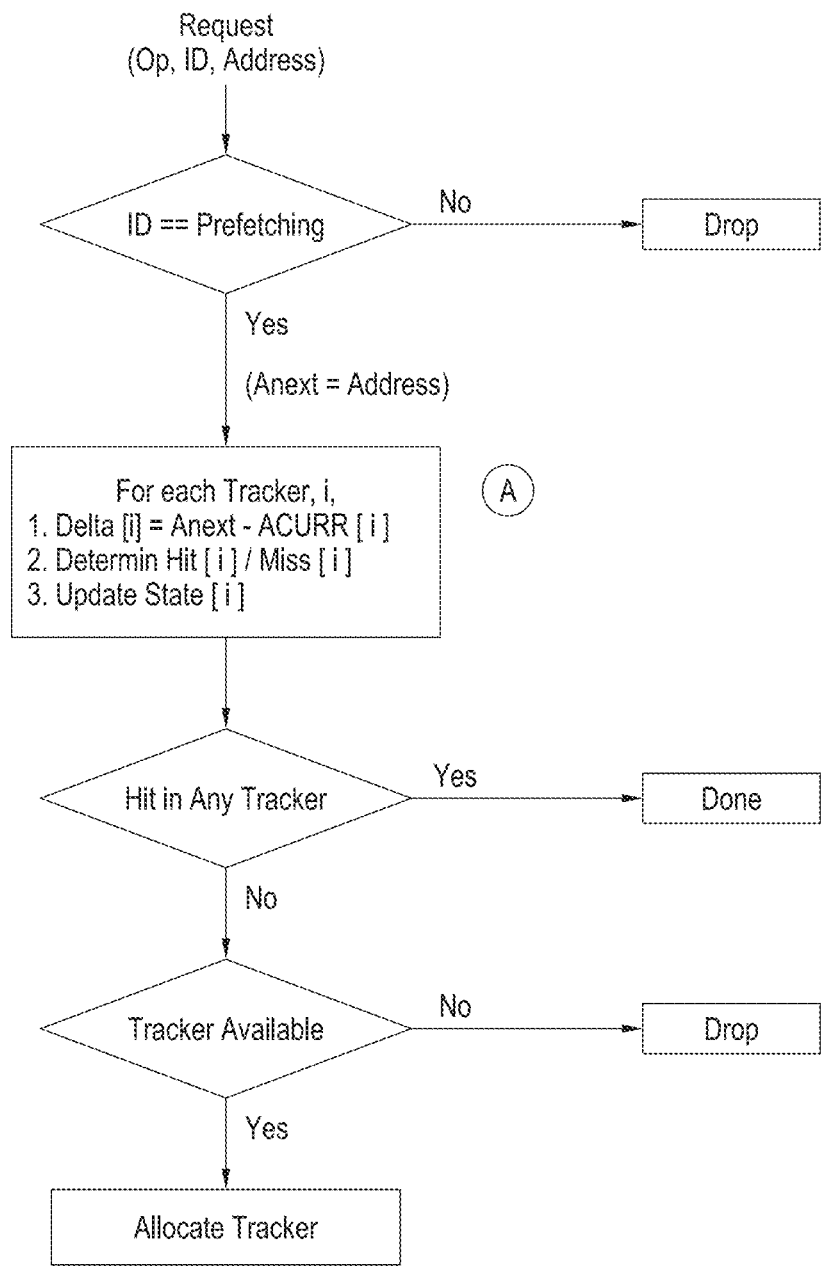
FIG. 20 is a flowchart showing the flow of memory requests in a typical APF.

FIG. 20 is a flowchart showing the flow of memory requests in a typical APF. Each tracker can issue a prefetch request. The arbiter selects a request taking in account prior history and the frequency of memory requests from affiliated streams, presented in the form of average time distance between subsequent requests in the stream (TDIST). If there is a pending prefetch request in the arbiter FIFO, it asserts a request signal to the SLC core tag arbiter. When that request passes tag arbitration, the SLC core returns an acknowledge signal, and the prefetch request is removed from the FIFO.

FIG. 21 depicts a table for the master configuration register set. As an example, the master ID may be represented directly with 6 bit Ax user signals. Some of the prefetch characteristics of individual master IDs that can be configured include the maximum age and maximum prefetch counts, and the like. The prefetch master can be selected with FLT_EN=1. The EDA in the table refers to early deallocation enable.

FIG. 22 depicts an example of an entry structure for a tracker in which there is control entry with MSTID. Consider now an early deallocation tracker as to random traffic. This mechanism causes a tracker to be released earlier when it is occupied by random traffic. The tracker also refers to the master ID value when it tries to find a stream request. Some embodiments include a tracker that only looks at the incoming request address, regardless from which master is involved. Therefore, the tracker should be occupied until it reaches the maximum AGE configuration value before the tracker is released.

When there is no tracker hit, any available tracker is allocated to the requested address, Anext, and the ACURR entry is updated to the address. The MSTID entry stores the master information and this tracker starts only watching the request address from this master. If consecutive requests from the same master do not follow in any steam within the strides pool, the tracker can be released for other stream candidates.

Figure 23:
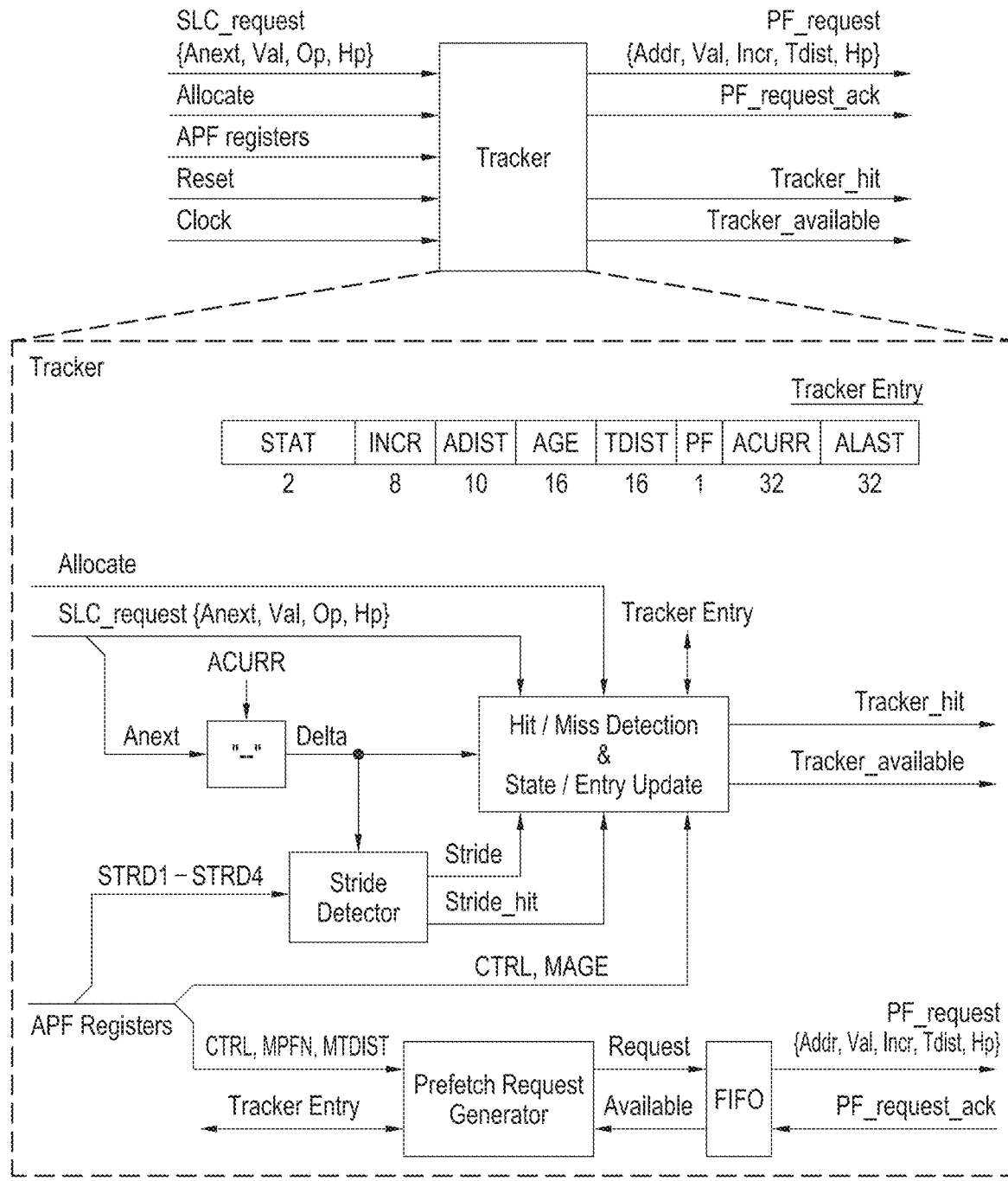
FIG. 23 is a block diagram showing typical components of a tracker in more detail.

FIG. 23 is a block diagram showing typical components of a tracker in more detail. In general, the functioning of the tracker is controlled by the content of the entry.

Every incoming address, Anext, is compared with the content of the field, ACURR, to define the distance between the next address and previous one. This is denoted as the delta. If V=0 (tracker is available), the content of ACURR is undefined and the result of the comparison, delta, is also undefined.

The value of the delta is analyzed by a stride detector, which checks whether the delta matches one of the expected strides. This is usually performed at the beginning of tracking, and the result of this check is used when the tracker is in an initial tracking state (e.g., as in FIG. 2).

The pool of expected strides includes hardwired values and programmed values, coming from registers STRD1, STRD2, STRD3, and STRD4. The unit of the stride may be any desired length. As an example, the unit of a stride maybe 64 bytes, such that when, for example, stride=10, it indicates the memory address distance of 640 bytes. Strides can be positive or negative, and negative numbers can be represented in 2-s complement format; for example, −3 can be represented in 8-bits as 8'b1111_1101.

In general, memory address strides are not expected to span beyond a certain boundary (e.g., 4 KB). Therefore, their representatives (being multiples of 64) in the stride detector block do not need more than 6 bits to represent the absolute value of a stride. Together with sign, it makes 7 bits, so 8 bits allocated for programmable stride values is generally sufficient. FIG. 24 is a table showing examples of hardwired strides and their associated distance value.

It is to be understood that network on a chip (NoC) components (or interconnect) can split or modify the original master request command. Therefore, the APF may possibly receive stream requests with varying strides, even though a master generates stream requests with a fixed stride. Each master configuration register contains a register field to disable the hardwired stride comparison for the specific masters for which the actual stride is known.

Figure 29:
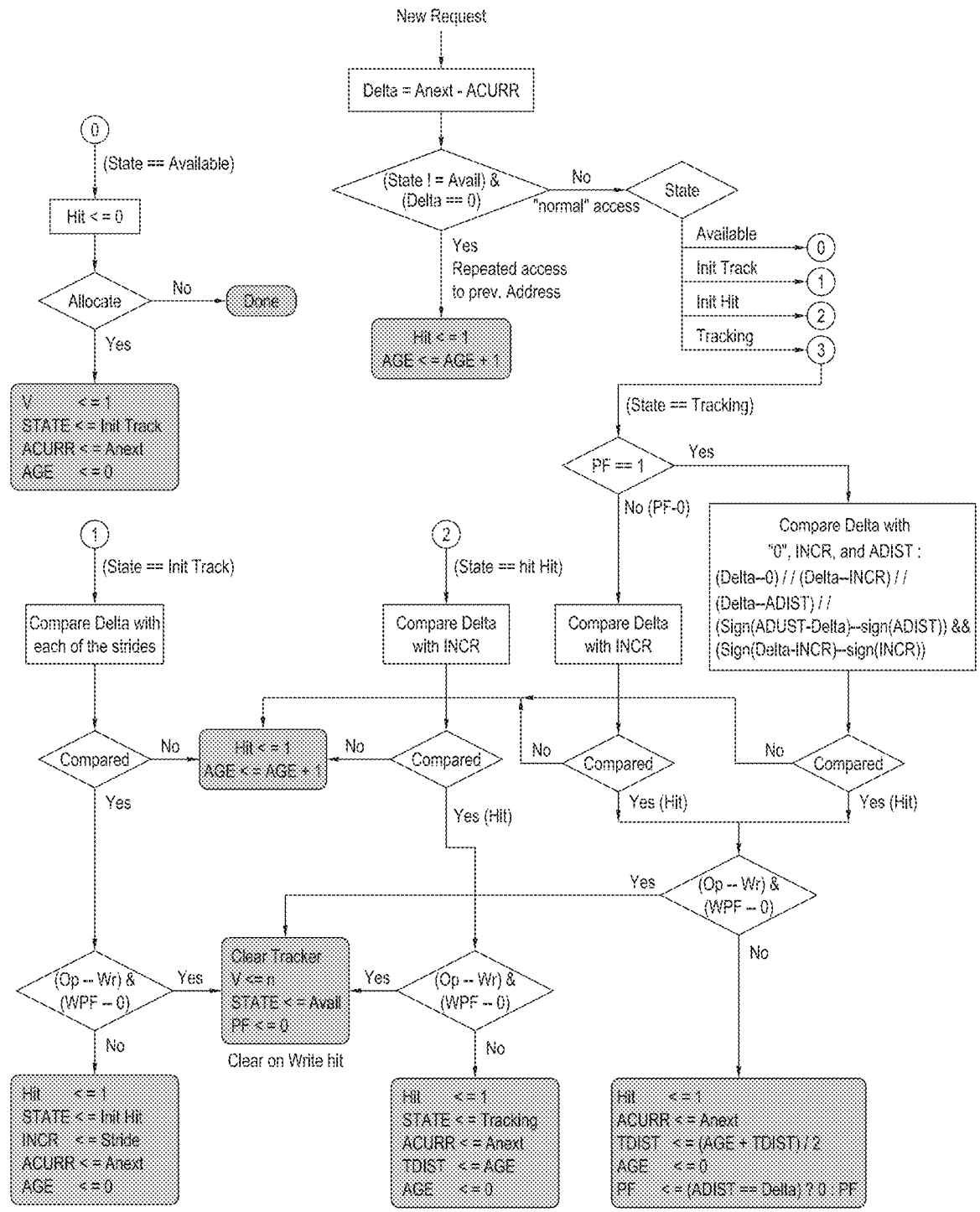
FIG. 29 is a flowchart showing the flow of Hit/Miss detection and the state update.

Referring still to FIG. 23, consider the hit detection and state & entry update block. The block may be used as a tracker controller. Details of processing flow of this block are shown in the flowchart of FIG. 29, which is a flowchart showing the flow of Hit/Miss detection and the state update by the tracker.

Checking for 'Delta==0' is usually performed to avoid allocation of a new Tracker (by responding with a Hit) when there is a subsequent request to the same address. Even if it was issued by another master in the system, it is very possible that it will use the same access pattern as the original master (for whom the tracking is already established).

When a Tracker is "Available", it responds with Hit=0. It then can be selected to accommodate a new request (its allocate input will be asserted), and in that case the state is changed to "Initial Tracking?.

In other states, Hit determination is a function of a specific state. For instance, in "Initial Tracking", a Hit happens when delta has matched one of the strides. In addition, in "Initial Hit", a Hit happens when delta matches an assumed increment value stored in the field INCR of the Entry.

In the "Tracking" state, a Hit determination depends on whether prefetch has been issued or not (including consumed previously issued prefetches). If a prefetch has not been issued, a Hit happens when delta matches increment value stored in the field INCR of the entry. On the other hand, when a prefetch has been issued, a Hit happens when a new address points to an interval between a previous access address (ACURR) and the address of the last prefetch (ALAST).

FIG. 25 shows analysis of a request address, Anext, in the tracker when there is a positive increment, and FIG. 26 shows analysis of a request address, Anext, in the tracker when there is a negative increment. FIG. 27 is a table showing a number of hit conditions and associated cases. The Hit detection conditions can be expressed in pseudo-code such as that depicted in FIG. 28.

As shown in FIGS. 25-28, cases A, C and G are misses, while cases B and D are hits. Cases E and F are misses when prefetch has not been issued (PF=0). When the prefetch has been issued and is running ahead of requests (PF=1), all four cases, B, D, E and F are hits.

A hit in case B is a special hit and it indicates the hit to the tracker allocator, but does not cause a change in the tracker's state, except for incrementing the AGE, as if it was a miss. A hit in case F causes all updates associated with a regular hit, and it clears the PF flag as well.

If a write to the tracking region is detected (Hit=1), tracking may be ended, or continued, depending on the WPF bit in the CTRL register. If tracking is continued, prefetch requests will be issued on behalf of writes. This will typically lead to potentially fewer misses on writes. On the other hand, it will usually cause an increase in the number of DRAM accesses. Yet another factor to consider when selecting the setting for WPF is that not all write misses cause DRAM access. If a victim sector is clean and the write is of a full cache line, a DRAM read is usually not required. Note further that the Gh16 SLC may be implemented to disable the WPF feature as it does not send any write requests to the APF.

Consider the example of a 4 KB memory boundary hit and case C. The 4 KB page memory allocation is commonly used and a master could accesses this memory page with a random access pattern. Since the access pattern is not a steam, multiple trackers could be allocated falsely and therefore be wasted, although in most cases only a master alone accesses the 4 KB page memory region. To prevent multiple trackers being allocated to a single master accessing in the same page address, each tracker generates a flag signal.

This internal signal, called for example 'tracker_hit_4k', is delivered to the tracker allocation logic and if any tracker raises the flag, no other tracker would be allocated for the request. Anext and Alast are usually 64B address. FIG. 30 is an example of pseudo code that may be used to generate the flag.

In addition, case C (FIGS. 25, 26) may be treated as a miss for the tracker state update. However, this request may also generate a 'tracker_hit' signal to prevent another tracker to be allocated. A single stream could have different stride requests temporarily, for example, 0×80, 0×100, 0×140, 0×180, 0×200, 0×280, 0×2C0, 0×300, and so on. When this occurs, allocating more than one tracker for the steam may generally result in a waste of tracker resources.

The 'tracker_hit_4k' flag signal generation is generally configurable for each master ID. Master configuration registers usually have a field to enable or disable this feature. Some masters intentionally generate two separated streams within the same 4 KB boundary.

Referring again to FIG. 29, this figure depicts a flowchart showing the flow of Hit/Miss detection and the state update. In accordance with an embodiment, a circuit, memory device and method, for example, may be used for controlling memory prefetch requests to system level cache (SLC). This request includes identifying memory access requests received at the system level cache (SLC) from a system on a chip (SoC) component Each of the memory access requests include an address (ANEXT) of memory to be accessed and a component ID. A further operation includes associating a tracker, from among a plurality of trackers, with each of identified memory access streams, where each of the plurality of trackers comprise entry parameters of status, increment, address distance (ADIST), age (AGE), temporal distance (TDIST), prefetch status (PF), current address (ACURR), last prefetched address (ALAST), and the like. One operation includes issuing a prefetch request to the system level cache (SLC), when the status is tracking and the address (ANEXT) points to an interval between the current address (ACURR) and the last prefetched address (ALAST) and other operation includes waiting for further requests to control a prefetch process, when the status is tracking, and distance (ADIST) between the current address (ACURR)

and the last prefetched address (ALAST) is greater than a specified maximum prefetch for the associated tracker.

The tracker of FIG. 29 may be implemented using, for example, the arbiter of FIG. 1. In an embodiment, the arbiter may perform receiving simultaneously a plurality of the issued prefetch requests, where each of the plurality of issued prefetch requests is associated with one of the plurality of trackers. Each of the plurality of issued prefetch requests comprises the address (ANEXT), memory bank identification, and frequency of requests expressed as the temporal distance (TDIST). The arbiter further provides a first priority to any prefetch request of the plurality of issued prefetch requests that has higher frequency and the memory bank identification is for a bank address that is different from a last two granted prefetch requests and provides a second priority, in a case of a same frequency, to any prefetch request of the plurality of issued prefetch requests that the memory bank identification is for the bank address that is different from the last two granted prefetch requests.

The arbiter further includes providing a third priority to any prefetch request of the plurality of issued prefetch requests that has the higher frequency and then issuing a prefetch request to the SLC according to a descending order of the first priority, the second priority, and the third priority.

Figure 31:
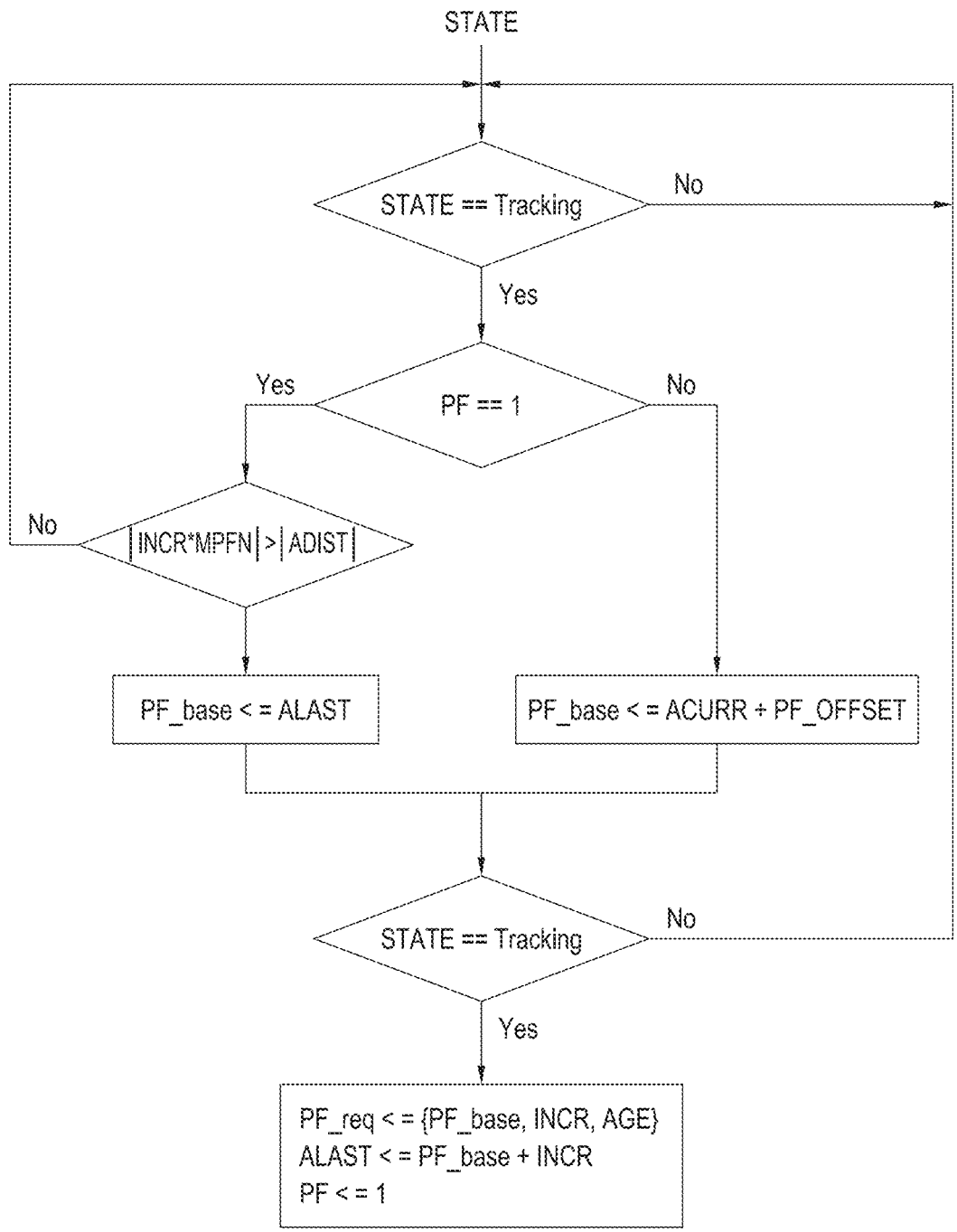
FIG. 31 is a flowchart showing prefetch request generation.

FIG. 31 is a flowchart showing prefetch request generation. While in the "Tracking" state, the tracker is issuing prefetch requests. Once that request has been accepted by the arbiter, the next prefetch request is generated, and the process is repeated. Even after a master in a SoC has ended a current sequence, the tracker will usually keep running for some time, until it reaches MAX_AGE. During this period, it may keep issuing prefetch requests. Another parameter, specified by register MPFN, is often implemented to limit the number of prefetch requests per Tracker The tracker may be allowed to generate prefetch requests within the distance of (MPFN*INCR). When ADIST, ALAST−ACURR, becomes larger than this value, the tracker is blocked to generate a prefetch request. Each master configuration register has a prefetch offset field (PFOS). When this register is configured, the start address of prefetch requests have an additional offset of 1×, 2×, 4×, 8×, 16×, or 32× of INCR as it is configured.

When a requesting master in the system issues requests with high frequency, it may not be beneficial to prefetch for it using APF. The value in TDIST reflects an average frequency of requests, and it is compared against the value in the MTDIST register which specifies minimal frequency of requests for which prefetch is allowed. By default, this register may be set to 0 so that requests with any frequency will cause a prefetch. Some implementations change this value to some non-zero value according to behavior of the system. Note that another way to measure the number of issued and not consumed prefetches is to calculate (ADIST/INCR).

The request FIFO (FIG. 23) stores requests issued by the prefetch generator. Once the Arbiter accepts requests from the tracker, the FIFO is popped up and becomes available for a new prefetch request. If it is full, prefetch requests generated by the tracker are discarded. The tracker behaves as if it has unlimited depth of FIFO, and as soon as its requests are accepted by the arbiter, the tracker catches up the incoming stream although it fell behind while the FIFO is full.

The depth of the FIFO does not have to be large and may be as small as one entry. There are several reasons for such a design. If the stream behind the tracker is very active, there is a small chance that the Arbiter will be able to service two back-to-back requests from the same tracker. In addition, when multiple streams are very active and the arbiters are stalled, the requests in the FIFO are likely outdated. When the master supported by the tracker is not very active it matters even less, since the priority at the arbiter for requests from that tracker will generally be low. Therefore, an acceptable FIFO depth is not more than two, but larger or small depths may alternatively be used.

Figure 32:
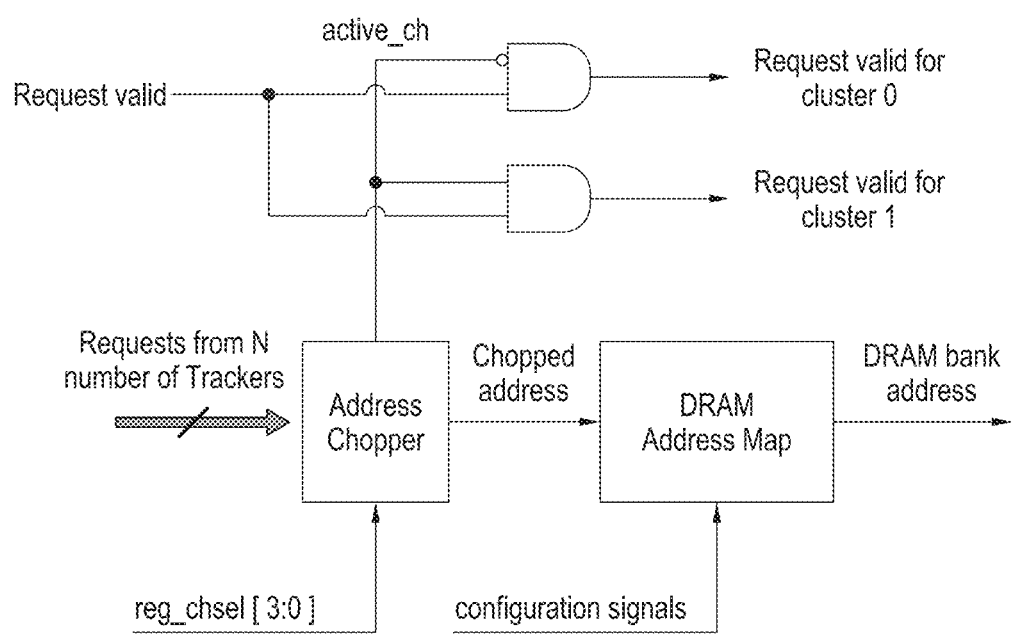
FIG. 32 is a block diagram of a cluster address mapper.

FIG. 32 is a block diagram of a cluster address mapper. The APF generates requests from N number of trackers and each tracker can generate requests for both SLC clusters. The APF has two separated request arbiters and each arbiter sends the requests to the correlated cluster. The channel selection bit of a prefetch request address decides where the request has to be directed. The bit position of channel selection is configured by a control signal.

The cluster address map module includes two main function blocks; the address chopper and the DRAM address mapper. The APF request arbiter arbitrates prefetch requests from multiple trackers based on the DRAM bank address. The DRAM bank address is usually matched to the bank address arrived at the DRAM. Therefore, the address chopper truncates the channel bit from the request address and forwards it to the DRAM address mapper without the channel bit. Then, the DRAM address mapper extracts the DRAM bank address based on its configuration.

Bank address bits are configured by a reg_bank control signal. When this signal is set to a defined value (e.g., 0×0), the DRAM bank address bits are [15:13]. If set to 0×1, the bank address is located at bit [14:12] of the request address and the remaining configuration makes the DRAM bank address bits to [11:9].

The bank address generated by the DRAM address map block includes a DRAM bank address, rank address, and a sub-channel address for LPDDR4. When the SLC is connected to the LPDDR3 controller, the rank and sub-channel bit would be configured to zero by setting reg_2ranken and reg_2chen to zero. If the LPDDR4 controller is used and dual rank address is considered, rank_sel signal decides where the rank address bit is located.

FIG. 33 is a table providing an example of a DRAM rank address configuration. As noted above, a sub-channel bit of the LPDDR4 is also a part of the bank address. If reg_2chen sets to high, the address bit [8] is a sub-channel bit. When reg_2chen sets to low, the sub-channel bit stays zero.

Figure 34:
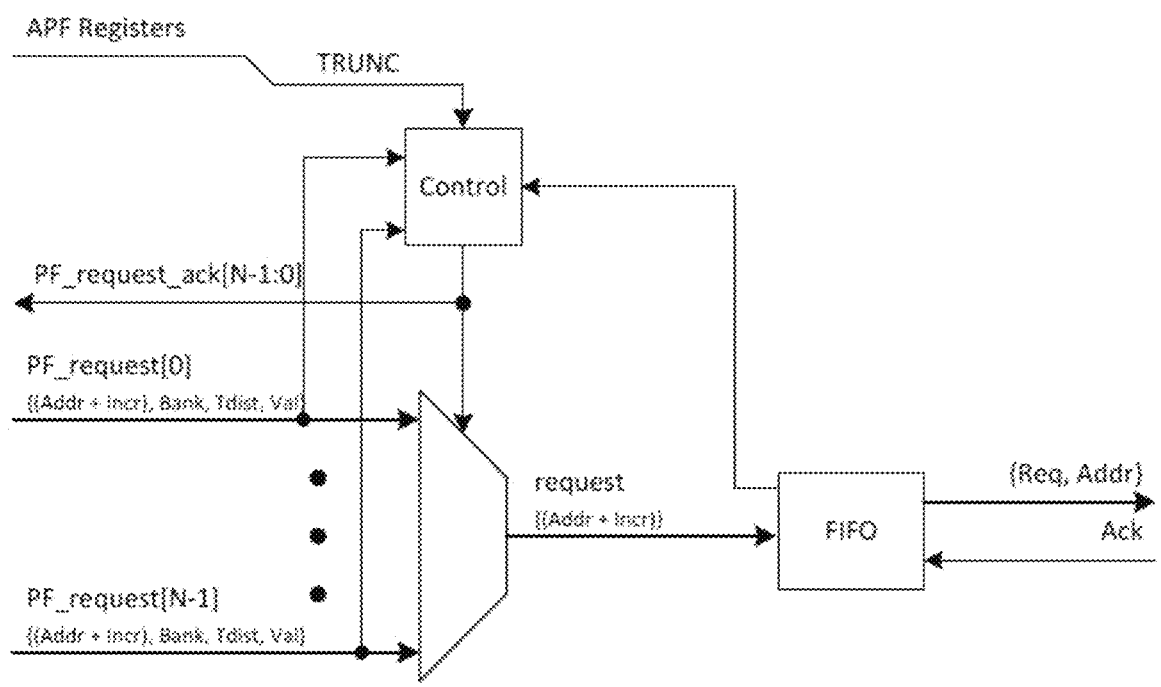
FIG. 34 is a block diagram showing in more detail components of the arbiter of FIG. 1.

FIG. 34 is a block diagram showing in more detail components of the arbiter shown in FIG. 1. Requests from individual trackers, including the value of TDIST are submitted to the arbiter. The control blocks functions to provide arbitration and gives priority to requests with different DRAM bank address. In addition, it gives priority to requests with higher frequency (lower value of TDIST). Register TRUNC allows discarding a small difference between TDIST values by masking their LSBs. For example, if TRUNC=FFF0h, 4 LSB of TDIST will be cleared prior to entering arbitration logic, such that requests with TDIST=1234h and TDIST 123Ah will be considered having equal priority.

In accordance with an embodiment, three priority based arbitration schemes may be used. In general, the first scheme has the highest priority, and the next lower than above. In particular, a first scheme is where a request has a higher frequency and its DRAM bank address differs from the last two granted requests. A second scheme is where the request has different DRAM bank address from the last two granted requests. A third scheme is where the request has a higher frequency.

The arbiter stores the two last DRAM bank addresses for each cluster. The SLC has two separated clusters so there are two arbiter instances for each cluster in the APF. Each SLC request is sent to one of the two clusters through the associated arbiter and two last DRAM bank addresses are compared. Arbitration between clusters may be conducted by a reg_chsel control signal. For example, if this signal is configured to be 4'b0, the 8th bit of prefetch request address will determine which one of APF arbiters take care of the request. When the channel bit is zero, requests are directed to cluster 0, and vice versa.

If there are several requests with the same priority, the arbiter will usually implement a round robin policy. In addition, it takes into account the state of FIFO, such that the corresponding bit in response signal to the trackers, PF_request_ack[N−1:0], is asserted when the FIFO is not empty to accommodate the request.

There is a special case of a minimal increment of 64 bytes where it may be beneficial not to generate more than one request. This is specifically suitable for caches with sector organization, where a sector is comprised of four consecutive blocks, 64 bytes each. Such cache can issue memory requests of 4×64 by receiving a single 64-byte request. The INCR64 bit in CTRL register disables generation of two or four prefetch requests for the cases with Incr=64.

When the FIFO is not empty, it asserts requests to the SLC core, accompanied with the data, which is the address of the prefetch request. Once this request is selected by the SLC core, it sends back an acknowledge signal. This signal pops up the FIFO, so the next request's data becomes available as a new APF prefetch address, provided the FIFO is not empty. In other words, the APF request signal is the inverse of the FIFO's empty status.

FIG. 35 is a table showing a summary of AFT registers that may be implemented in the tracker. In this table, the APF registers occupy a 1 KB region, which allows up to 256 32-bit registers. The relative address (offset) of the registers uses 8 bit. The access parameter may be R/W, which is read and write, RAZ, which is read as zero, or WI, which is write ignored. The APF registers are in offset order from the base memory address.

FIG. 36 is a table showing register interface signals that may be utilized by the tracker. These signals are coming from an external block that receives register access requests through either the APB, AHB, or AXI bus, and are transformed according to the table.

FIG. 37 is a table showing SLC observation signals that may be utilized by the tracker. These signals are from the SoC request input to the SLC Core request arbiter. The Slc_req_val is asserted for one cycle when the SLC Core request arbiter selects the SoC request. FIG. 38 is a table showing DRAM memory address configurations that may be implemented by the tracker, and FIG. 39 is a table showing APF prefetch interface signals.

FIG. 40 is a table showing AFT event signals. For example, the APF provides an event signal, called 'apf_events' to monitor its operation. This event signal can be connected to the SLC event counter to be read from software.

As presented herein, various hardware prefetching mechanisms are widely used in systems with caches. Last Level Cache, or System Level Cache (SLC), in SoC applications can be accessed by many system masters which have different memory access patterns. Prefetching can provide benefits to some, but have not benefit to others.

While potentially useful, prefetching has its own demands. For instance, since cache size is limited, prefetched data may occupy the place of other data, forcing their eviction from the cache. If prefetched data is not used on time (e.g., when prefetched too early, or prefetched from a memory region which will be not referenced (overprefetch)), this data may be evicted from the cache before being requested. Prefetch may also increase main memory traffic, especially in the case of overprefetch. Efficient prefetching for SLC in the SoC generally assumes the loading of the cache which will be mostly utilized on time, while minimizing overprefetch.

The APF dynamically observes memory access behavior and deduces possible access regularities from such monitoring. The APF then issues memory requests ahead of actual requests so the data will be loaded to the cache allowing the actual requests to find data in the cache.

It is to be understood that each request entering the SLC is analyzed from the point of view of its affiliation with certain system masters. For the masters which can benefit from prefetch, their requests are considered part of an access sequence with an access stride. For instance, there is a pool of M strides (some of which are fixed and others programmable). After the address of the first requests is captured, the address of the next request is analyzed, and if the distance between the current address and a subsequent address matches one of the strides from the pool, an assumption can be made. Specifically, it can be assumed that there is indeed a sequence. Tracking the sequence of it is established and the assumed stride is recorded in an allocated tracker. If then yet another address has the same stride, the confidence in that sequence increases.

Once some level of confidence is achieved, the APT will initiate a prefetch request in accordance with a perceived access pattern. If for some (programmable or otherwise defined) period of time there are no accesses conforming to the assumed stride, tracking and prefetching for that sequence may then be cancelled. There is also control (programmable or otherwise defined) of how far from the latest request that the prefetching may continue.

The APF can support several access streams, with individual programmed parameters stored in the dedicated trackers. For each stream there is also a measure of its bandwidth requirement. To issue a next prefetch request, the APF arbitrates between the trackers based on the bandwidth requirements of their affiliated streams.

Some embodiments presented herein may be implemented to include simultaneous prefetch for several SoC masters, programmable selection of the masters, prefetch control is individually tuned per a supported master, and reducing overprefetch by controlling how far prefetch may go, or detecting the end of the stream. Further features include understanding bandwidth requirements of each supported stream and using such information when selecting between the streams to issue a next prefetch request.

Various embodiments described herein may be implemented in a computer-readable medium, a machine-readable medium, or similar medium using, for example, software, hardware, or any combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

Various embodiments of the present invention have been described, but still further features may alternatively or additionally be implemented in accordance with alternative embodiments of the present invention. Although embodiments may be implemented using the exemplary series of operations described herein (e.g., in conjunction with the various flowcharts discussed above), additional or fewer operations may be performed.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

The invention claimed is:

1. A control circuit for controlling memory prefetch requests to system level cache (SLC), the control circuit comprising:
   a circuit configured to identify memory access requests received at the system level cache (SLC) from a system on a chip (SoC) component, wherein each of the memory access requests include an address (ANEXT) of memory to be accessed and a component ID;
   a circuit configured to associate a tracker, from among a plurality of trackers, with each of identified memory access streams,
   wherein each of the plurality of trackers comprise entry parameters of status, increment, address distance (ADIST), age (AGE), temporal distance (TDIST), prefetch status (PF), current address (ACURR), and last prefetched address (ALAST); and
   a circuit configured to perform tracking for each of the identified memory access streams by:
   when the status is tracking and the address (ANEXT) points to an interval between the current address (ACURR) and the last prefetched address (ALAST), issuing a prefetch request to the system level cache (SLC); and
   when the status is tracking, and distance (ADIST) between the current address (ACURR) and the last prefetched address (ALAST) is greater than a specified maximum prefetch for the associated tracker, waiting for further requests to control a prefetch process.

2. The control circuit of claim 1, wherein the circuit configured to perform tracking for each of the identified memory access streams is further configured to perform by:
   when the status is available, changing the state of the associated tracker from available to initial tracking, recording the address (ANEXT) as the current address (ACURR), and wait for further requests in order to identify a memory access pattern.

3. The control circuit of claim 1, wherein the circuit configured to perform tracking for each of the identified memory access streams is further configured to perform by:
   when the status is initial tracking, and a difference between the address (ANEXT) and the current address (ACURR) matches a stride from a pool of strides, changing the state of the associated tracker from initial tracking to initial hit and waiting further requests to confirm the selected stride.

4. The control circuit of claim 3, wherein the circuit configured to perform tracking for each of the identified memory access streams is further configured to perform by:
   when the status is initial tracking, and the difference between the address (ANEXT) and the current address (ACURR) does not match the stride from the pool of strides, incrementing a value of the age (AGE) as the request is considered a miss.

5. The control circuit of claim 1, wherein the circuit configured to perform tracking for each of the identified memory access streams is further configured to perform by:
   when the status is initial hit and a difference between the address (ANEXT) and the current address meets a value of the increment, changing the state of the associated tracker from initial hit to tracking and waiting for further requests to control a prefetch process.

6. The control circuit of claim 5, wherein the circuit configured to perform tracking for each of the identified memory access streams is further configured to perform by:
   when the status is initial hit and the difference between the address (ANEXT) and the current address does not meet the value of the increment, incrementing a value of the age (AGE) as the request is considered a miss.

7. The control circuit of claim 1, wherein the circuit configured to perform tracking for each of the identified memory access streams is further configured to perform by:
   when the status is tracking and the address (ANEXT) does not point to the interval between the current address (ACURR) and the last prefetched address (ALAST), incrementing the value of the age (AGE) as the request is considered a miss.

8. The control circuit of claim 7, wherein the circuit configured to perform tracking for each of the identified memory access streams is further configured to perform by:
   when the value of the age (AGE) reaches a maximum age (MAXAGE), changing the state of the associated tracker from tracking to available.

9. The control circuit of claim 1, wherein the circuit configured to perform tracking for each of the identified memory access streams is further configured to perform by:
   receiving simultaneously a plurality of the issued prefetch requests, wherein each of the plurality of issued prefetch requests is associated with one of the plurality of trackers, and wherein each of the plurality of issued prefetch requests comprises the last prefetched address (ALAST), memory bank identification, and frequency of requests expressed as the temporal distance (TDIST);
   providing a first priority to any prefetch request of the plurality of issued prefetch requests that has higher frequency and the memory bank identification is for a bank address that is different from a last two granted prefetch requests;
   providing a second priority, in a case of a same frequency, to any prefetch request of the plurality of issued prefetch requests that the memory bank identification is for the bank address that is different from the last two granted prefetch requests;
   providing a third priority to any prefetch request of the plurality of issued prefetch requests that has the higher frequency; and
   issuing a prefetch request to the SLC according to a descending order of the first priority, the second priority, and the third priority.

10. A memory device, comprising
system level cache (SLC); and
control circuitry comprising:
  a circuit configured to identify memory access requests received at the system level cache (SLC) from a system on a chip (SoC) component, wherein each of the memory access requests include an address (ANEXT) of memory to be accessed and a component ID;
  a circuit configured to associate a tracker, from among a plurality of trackers, with each of identified memory access streams,
  wherein each of the plurality of trackers comprise entry parameters of status, increment, address distance (ADIST), age (AGE), temporal distance (TDIST), prefetch status (PF), current address (ACURR), and last prefetched address (ALAST); and
  a circuit configured to perform tracking for each of the identified memory access streams by:
    when the status is tracking and the address (ANEXT) points to an interval between the current address (ACURR) and the last prefetched address (ALAST), issuing a prefetch request to the system level cache (SLC); and
    when the status is tracking, and distance (ADIST) between the current address (ACURR) and the last prefetched address (ALAST) is greater than a specified maximum prefetch for the associated tracker, waiting for further requests to control a prefetch process.

11. The memory device of claim 10, wherein the circuit configured to perform tracking for each of the identified memory access streams is further configured to perform by:
  when the status is available, changing the state of the associated tracker from available to initial tracking, recording the address (ANEXT) as the current address (ACURR), and wait for further requests in order to identify a memory access pattern.

12. The memory device of claim 10, wherein the circuit configured to perform tracking for each of the identified memory access streams is further configured to perform by:
  when the status is initial tracking, and a difference between the address (ANEXT) and the current address (ACURR) matches a stride from a pool of strides, changing the state of the associated tracker from initial tracking to initial hit and waiting further requests to confirm the selected stride.

13. The memory device of claim 12, wherein the circuit configured to perform tracking for each of the identified memory access streams is further configured to perform by:
  when the status is initial tracking, and the difference between the address (ANEXT) and the current address (ACURR) does not match the stride from the pool of strides, incrementing a value of the age (AGE) as the request is considered a miss.

14. The memory device of claim 10, wherein the circuit configured to perform tracking for each of the identified memory access streams is further configured to perform by:
  when the status is initial hit and a difference between the address (ANEXT) and the current address meets a value of the increment, changing the state of the associated tracker from initial hit to tracking and waiting for further requests to control a prefetch process.

15. The memory device of claim 14, wherein the circuit configured to perform tracking for each of the identified memory access streams is further configured to perform by:
  when the status is initial hit and the difference between the address (ANEXT) and the current address does not meet the value of the increment, incrementing a value of the age (AGE) as the request is considered a miss.

16. The memory device of claim 10, wherein the circuit configured to perform tracking for each of the identified memory access streams is further configured to perform by:
  when the status is tracking and the address (ANEXT) does not point to the interval between the current address (ACURR) and the last prefetched address (ALAST), incrementing the value of the age (AGE) as the request is considered a miss.

17. The memory device of claim 16, wherein the circuit configured to perform tracking for each of the identified memory access streams is further configured to perform by:
  when the value of the age (AGE) reaches a maximum age (MAXAGE), changing the state of the associated tracker from tracking to available.

18. The memory device of claim 10, wherein the circuit configured to perform tracking for each of the identified memory access streams is further configured to perform by:
  receiving simultaneously a plurality of the issued prefetch requests, wherein each of the plurality of issued prefetch requests is associated with one of the plurality of trackers, and wherein each of the plurality of issued prefetch requests comprises the last prefetched address (ALAST), memory bank identification, and frequency of requests expressed as the temporal distance (TDIST);
  providing a first priority to any prefetch request of the plurality of issued prefetch requests that has higher frequency and the memory bank identification is for a bank address that is different from a last two granted prefetch requests;
  providing a second priority, in a case of a same frequency, to any prefetch request of the plurality of issued prefetch requests that the memory bank identification is for the bank address that is different from the last two granted prefetch requests;
  providing a third priority to any prefetch request of the plurality of issued prefetch requests that has the higher frequency; and
  issuing a prefetch request to the SLC according to a descending order of the first priority, the second priority, and the third priority.

19. A method for controlling memory prefetch requests to system level cache (SLC), the method comprising:
  identifying memory access requests received at the system level cache (SLC) from a system on a chip (SoC) component, wherein each of the memory access requests include an address (ANEXT) of memory to be accessed and a component ID;
  associating a tracker, from among a plurality of trackers, with each of identified memory access streams, wherein each of the plurality of trackers comprise entry parameters of status, increment, address distance (ADIST), age (AGE), temporal distance (TDIST), prefetch status (PF), current address (ACURR), and last prefetched address (ALAST);
  issuing a prefetch request to the system level cache (SLC), when the status is tracking and the address (ANEXT) points to an interval between the current address (ACURR) and the last prefetched address (ALAST); and
  waiting for further requests to control a prefetch process, when the status is tracking, and distance (ADIST) between the current address (ACURR) and the last prefetched address (ALAST) is greater than a specified maximum prefetch for the associated tracker.

\* \* \* \* \*